United States Patent
Jackson

(10) Patent No.: US 12,237,657 B2
(45) Date of Patent: Feb. 25, 2025

(54) CABLE GLANDS

(71) Applicant: Hubbell Limited, London (GB)

(72) Inventor: Carl Jackson, Manchester (GB)

(73) Assignee: Hubbell Limited, London (GB)

( * ) Notice: Subject to any disclaimer, the term of this patent is extended or adjusted under 35 U.S.C. 154(b) by 260 days.

(21) Appl. No.: 17/776,133

(22) PCT Filed: Nov. 11, 2020

(86) PCT No.: PCT/GB2020/052862
§ 371 (c)(1),
(2) Date: May 11, 2022

(87) PCT Pub. No.: WO2021/094742
PCT Pub. Date: May 20, 2021

(65) Prior Publication Data
US 2022/0399705 A1 Dec. 15, 2022

(30) Foreign Application Priority Data
Nov. 12, 2019 (GB) .................................... 1916431

(51) Int. Cl.
*H02G 3/22* (2006.01)
*H02G 3/06* (2006.01)
*H02G 15/04* (2006.01)

(52) U.S. Cl.
CPC ............. *H02G 3/22* (2013.01); *H02G 3/0675* (2013.01); *H02G 15/046* (2013.01)

(58) Field of Classification Search
CPC ........ H02G 3/06; H02G 15/04; H02G 3/0675; H02G 1/145; H02G 3/0658; H02G 15/043;
(Continued)

(56) References Cited

U.S. PATENT DOCUMENTS 8,134,088 B2 * 3/2012 Naumann ............ H02G 3/0675
174/653
8,895,878 B2 * 11/2014 Drotleff ............... H02G 3/0666
174/654

(Continued)

FOREIGN PATENT DOCUMENTS

CA 2178909 A 2/1987
CA 2063096 A 5/1993
(Continued)

OTHER PUBLICATIONS

International Search Report and Written Opinion mailed in Application No. PCT/GB2020/052862, dated Feb. 9, 2021.
(Continued)

*Primary Examiner* — Angel R Estrada
(74) *Attorney, Agent, or Firm* — Robinson + Cole LLP

(57) ABSTRACT

A sleeve (19) arranged to be slidably received within a passage (9) defined in a body of a cable gland (1), the sleeve (19) arranged to receive a settable sealing material for forming a seal to a cable passing through the sleeve, wherein the sleeve (19) comprises: an annular side wall (79) extending along an axial length and having a first end and a second end; and an end wall (100) capping the first end of the annular side wall (79), in which the annular side wall (79) and the end wall (100) define a void (106) within them into which settable sealing material can be received.

20 Claims, 5 Drawing Sheets

(58) Field of Classification Search
CPC .. H02G 15/003; H02G 15/113; H02G 15/013; H02G 3/22; H02G 3/18; F16L 5/04; F16L 5/10; H01R 4/66; H01R 13/59; H01B 17/58; H01B 17/583; H01B 17/586
USPC ....... 174/650, 667, 651, 652, 653, 654, 660, 174/135, 152 G, 153 G, 99 R, 72 A, 68.1, 174/73.1, 74 R, 655; 439/936, 910, 578, 439/320, 567; 16/2.1, 2.2; 248/68.1, 49; 285/154.4, 322, 331, 390, 154.1, 154.3; 277/313, 314
See application file for complete search history.

(56) References Cited

U.S. PATENT DOCUMENTS

| | | | | |
|---|---|---|---|---|
| 8,969,742 | B2* | 3/2015 | Bartholoma | H02G 3/0666 174/654 |
| 10,389,102 | B2* | 8/2019 | Jackson | H02G 3/0666 |
| 11,631,971 | B2* | 4/2023 | Mood | H02G 3/0675 174/74 R |
| 11,742,649 | B2* | 8/2023 | Lackinger | F16L 5/10 174/667 |

FOREIGN PATENT DOCUMENTS

| | | |
|---|---|---|
| CA | 2875463 A1 | 6/2015 |
| GB | 765082 A | 1/1957 |
| GB | 2485114 A | 5/2012 |
| WO | 02/067400 A1 | 8/2002 |

OTHER PUBLICATIONS

Search Report issued in GB Application No. 1916431.8, dated May 7, 2020.

* cited by examiner

CABLE GLANDS

The present invention relates to cable glands.

Cable glands are commonly used for sealing around a cable or conduit passing through an opening in a wall or bulkhead. For example, cable gland assemblies may be used to seal around a cable entering an enclosure such as a junction box, containing electrical equipment, to prevent fluids entering the enclosure or explosive forces exiting the enclosure. In some instances, cable glands can be used in harsh environments, such as underwater, in high temperatures, or harsh chemical environments.

Typically, a cable gland includes a body, through which the cable passes. The body is formed of a number of parts, that are fixed together to assemble the gland. Each joint can provide a source of leakage. A clamp to grip the cable, and prevent it being pulled out of the gland is provided in the body, along with a number of seals.

In many examples, the clamp also acts as one of the seals, or the seals may require tightening of the clamp and/or portions of the body. However, where the clamp fails or loosens, or the body is over or under tightened, this means that the seal also fails or weakens. Furthermore, it is important that the clamp does not damage the cable. Also, under compressive force, cold flow of the cable can occur, where the surface of the cable moves away from the compressive element, further risking loss of clamping force or ingress protection.

Typically one of the seals may be formed by a settable sealing material that is introduced into a sleeve (or pot) through which the cable passes. The sleeve is then received in the body. During assembly, the settable material is allowed to set in the sleeve. The sleeve is then slid out of the body, to allow inspection of the seal formed around the cable, and then slid back in, before the assembly is continued.

It is desired to provide a cable gland that is simple to assemble and inspect, and which can prevent a cable being pulled out, without damaging the cable.

According to a first aspect of the invention, there is provided a sleeve arranged to be slidably received within a passage defined in a body of a cable gland, the sleeve arranged to receive a settable sealing material for forming a seal to a cable passing through the sleeve, wherein the sleeve comprises:
  an annular side wall extending along an axial length and having a first end and a second end; and
  an end wall capping the first end of the annular side wall,
in which the annular side wall and the end wall define a void within them into which settable sealing material can be received.

As such, with a cable inserted in the second end, the end wall allows for the settable material to be introduced into the sleeve with the sleeve in any orientation; it does not need to be with the first end upwards.

As such, the end wall may have at least one orifice through which a core of the cable can pass. Typically, a proportion of the end wall made up of orifices may be less than 75%, 50%, 25% or 10%.

The end wall may be non-unitary with the annular side wall; typically, the end wall may be removed or replaced on the side wall without breaking any material from which the annular side wall or end wall is formed. As such, in this case, the end wall can be swapped between a selection of end walls depending on the number and/or size of cores in the cable.

Alternatively, each orifice may be provided as a press-out portion of the end wall, whereby a circumference of each orifice is formed in the end wall such that a portion of the end wall within each circumference can be pushed out by a user to form the orifice.

In a further alternative, the end wall may have been formed from a settable material, which is pressed and/or moulded around each core when the core is placed in the sleeve.

The sleeve may have an outer surface, which may include a tapered portion such that the external diameter of the sleeve widens in the tapered portion; the outer surface of the sleeve may be arranged to form a seal with the cable gland body.

The tapered sleeve ensures it is simple to slide the sleeve out of the body, to inspect the seal between the settable sealing material, during assembly of a cable gland including the sleeve. The tapered shape also helps to form a good seal between the sleeve and the body.

The outer surface may include a cylindrical portion, adjacent the tapered portion. The tapered portion may widen away from the cylindrical portion.

The sleeve may extend from a first end, arranged to be received adjacent an end of the cable gland body, to a second end, opposite the first end, arranged to be received within the passage of the cable gland. The tapered portion may widen towards the second end of the sleeve.

An inner surface of the sleeve may include a tapered portion, tapering in the same direction as the tapered portion of the outer surface. The tapered portion of the outer surface and the tapered portion of the inner surface may taper at different angles and/or over different axial lengths.

The sleeve may be transparent. This allows for easy inspection of the seal formed between the settable sealing material and the cable.

Typically, the sleeve will be formed from a polymeric material, typically an elastic material such as an elastomer.

According to a second aspect of the invention, there is provided a cable gland comprising: a body having a wall defining a passage extending in an axial direction from a first end to a second end, the passage of the cable gland arranged to receive a cable; adjacent the first end of the cable gland body, a cable gland sealing member according to the first aspect, received within the passage of the cable gland.

The passage of the cable gland may comprise an inner surface. At least part of the inner surface may form a receiving portion arranged to receive the sealing member. The receiving portion may have a taper matching the taper on the outer surface of the sleeve.

The cable gland sealing member may include a rim formed in an exterior surface of the sleeve, at the second end of the sleeve, and wherein the inner surface of the passage of the cable gland comprises a ledge arranged to engage the rim, to prevent withdrawal of the sleeve in an axial direction. A spacing may be formed between the rim and the ledge, to accommodate deformation or movement of the sleeve under compression.

The sealing member may extend out of the second end of the passage, or may be flush with the second end. However, in an alternative embodiment, the sealing member may not extend as far as the second end such that there is a gap between the sealing member and the second end of the passage. This can ensure that no sealing material is inadvertently deposited on the external portion of the cable gland.

The cable gland may comprise a tightening means to apply compression between the first end of the cable gland body and the second end of the cable gland body. Applying compression between the first and second ends of the cable gland body may compress the sealing member. An outer surface of the sealing member may form a seal with the cable gland body, under compression.

The cable gland may include a spigot received in the passage of the cable gland. The cable gland may also comprise means for fixing the spigot in the passage of the cable gland such that the spigot is arranged to locate the sleeve, and wherein the cable gland sealing member and spigot include correspond hooking projections, arranged to connect the sleeve to the spigot. The spigot may include a seal to prevent escape of the settable sealing material from the sleeve.

Where the sleeve is formed from metallic material, the spigot may be provided with a seat for the tapered portion of the outer surface of the sleeve. Furthermore, there may be provided a gap between the inner surface of the passage of the cable gland and the outer cylindrical surface of the sleeve; this can act as a flame path. The passage of the cable gland may have a step reduction in diameter at the first end to retain the sleeve.

The cable gland may include: a cable passing through the cable gland body and the sealing member; and a set sealing material received in the sleeve, forming a seal between the sleeve and the cable.

The cable gland may include: a cable gland clamp received in the passage of the cable gland, and arranged to grip a cable passing through the passage of the cable gland to prevent axial movement of the cable.

The clamp may comprise an insulating sleeve arranged to receive and grip an insulating outer sheath of a cable. The clamp may further comprise a clamping member arranged around the sleeve. The clamping member may comprise a body formed of insulating material. The clamping member body may have: an inner surface defining a passage extending in an axial direction through the clamping member body, from a first end to a second end, the clamping member passage arranged to receive a cable and exert a gripping force on the insulating outer sheath of the cable, through the insulating sleeve; and an outer surface arranged to engage the cable gland body, to prevent movement of the clamp from the cable gland body in the axial direction.

The cable gland may include: an ingress prevention seal arranged to seal between the cable gland body and a cable passing therethrough. The ingress prevention seal may be separate to the clamp.

The ingress prevention seal may comprise an annular retaining portion arranged to be sealingly secured to an end of a wall of a cable gland body, such that the seal is fitted outside the cable gland body. The ingress prevention seal may also comprise a sealing portion within the annular retaining portion. The ingress prevention seal may further comprise an aperture formed in the sealing portion, the aperture defined by mouth in the sealing portion, arranged to engage and grip a cable passing through the aperture, to form a seal.

The cable gland may include an explosion protection seal received within the cable gland body.

The cable gland body may include a first body part incorporating the first end of the cable gland body; and a second body part, secured to the first body part, and incorporating the second end of the cable gland body. The clamp and explosion protection seal may be received within the passage of the cable gland. The cable gland may further comprise: an armour clamp within the passage of the cable gland, arranged to grip an earthing shield of a cable passing through the gland.

The cable gland has a single external joint, and so the number of possible leakage points, and hence the number of required seals, is reduced. Furthermore, the surface area available on the surface of the gland is increased, providing more area for surface marking, and improving aesthetics.

According to a third aspect of the invention, there is provided a sealing apparatus for a cable gland, comprising:
the sleeve of the first aspect of the invention; and
a hollow member for delivering settable material into the void.

As such, the hollow needle can provide a conduit for the settable sealing material.

Typically, the hollow member may be arranged to puncture the material of the sleeve in order to pass through the sleeve to deliver the settable sealing material into the void. As such, the hollow member may have a sharpened tip. The hollow member may be of the form of a needle.

The apparatus may further comprise a further hollow member for exhausting air from the void. This may also be arranged to puncture the material of the sleeve in order to pass through the sleeve to allow air within the void to be exhausted. As such, the further hollow member may have a sharpened tip, and may be of the form of a needle. The further hollow member may therefore allow the escape of air within the void, which will need to be displaced to allow the void to be filled with settable sealing material.

The apparatus may comprise a plurality of end walls for the sleeve, each differing the number or size of orifices defined therein. As such, a user can decide on the correct end wall depending on the cable to be sealed.

According to a fourth aspect of the invention, there is provided a method of installing a cable having at least one core in the cable gland of the second aspect of the invention, the method comprising:
passing the cable at least partially through the cable gland;
exposing at least one core of the cable at an end of the cable;
placing the sleeve over each core at the end of the cable;
filling the sleeve with sealable setting material; and
assembling the cable gland over the sleeve so as to seal the cable gland over the cable.

Thus, the filling step can now take place in any orientation, and indeed may take place with the first end of the sleeve within 90 degrees of vertically downwards.

Typically, the filling step may comprise puncturing the sleeve with the hollow member and/or the further hollow member, and introducing the settable sealing material with the hollow member and/or allowing air within the void to exhaust through the further hollow member.

The step of placing the sleeve over each core may comprise selecting an end wall from a plurality of end walls, and placing that on an annular side wall to form the sleeve. Thus, a user can select the appropriate end wall from a selection, depending on the number of cores in the cable, and the size of those cores, for example.

In a further alternative, the method may comprise forming the end wall from a settable material, which is pressed and/or moulded around each core.

There now follows, by way of example only, a description of embodiments of the invention, described with reference to the accompanying drawings, and in which.

In the description of the embodiments that follows, the construction and/or arrangement and/or function and/or operation is only described insofar as necessary for an understanding of each embodiment and therefore the description of features that are the same or similar in different embodiments may not be repeated as these will be understood from their description in other embodiments. Accordingly, the embodiments are not to be read and interpreted in isolation and any feature described in a particular embodiment will be understood to have application to other embodiments unless specifically excluded by the description.

Figure 1A:
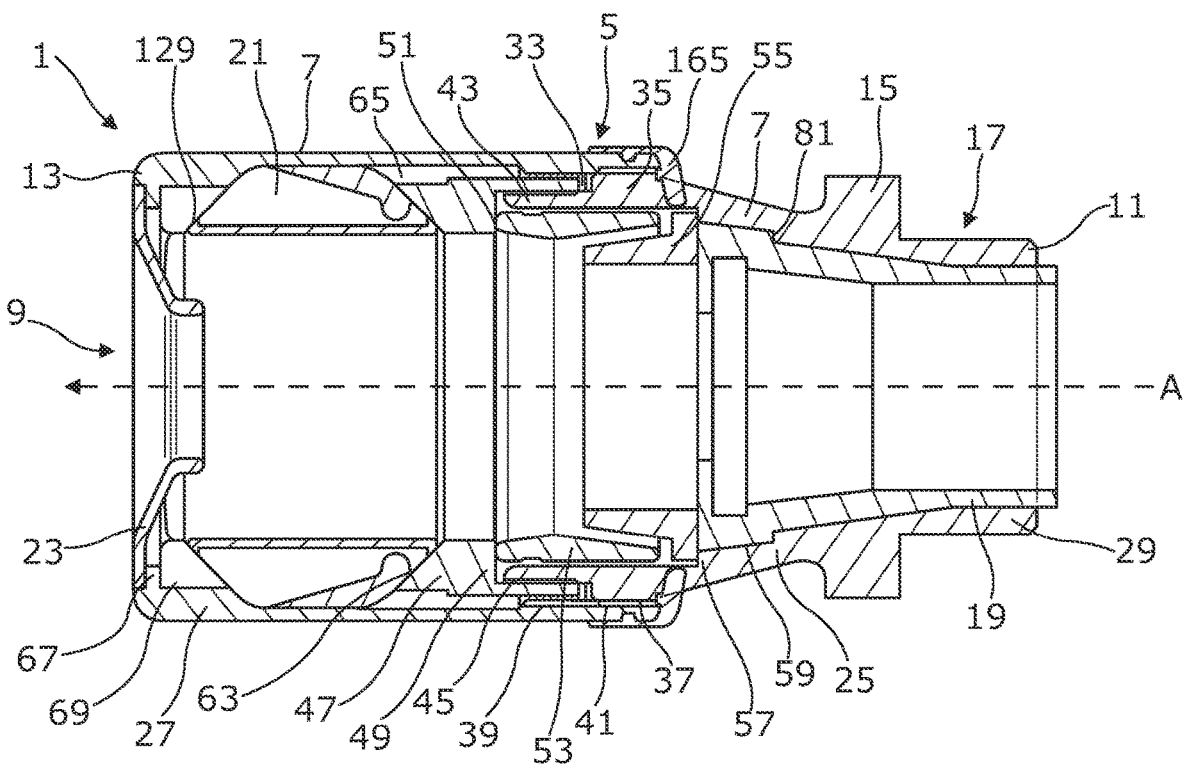
FIG. 1A is a schematic sectional view of a cable gland, according to an embodiment of the invention.
Figure 1C:
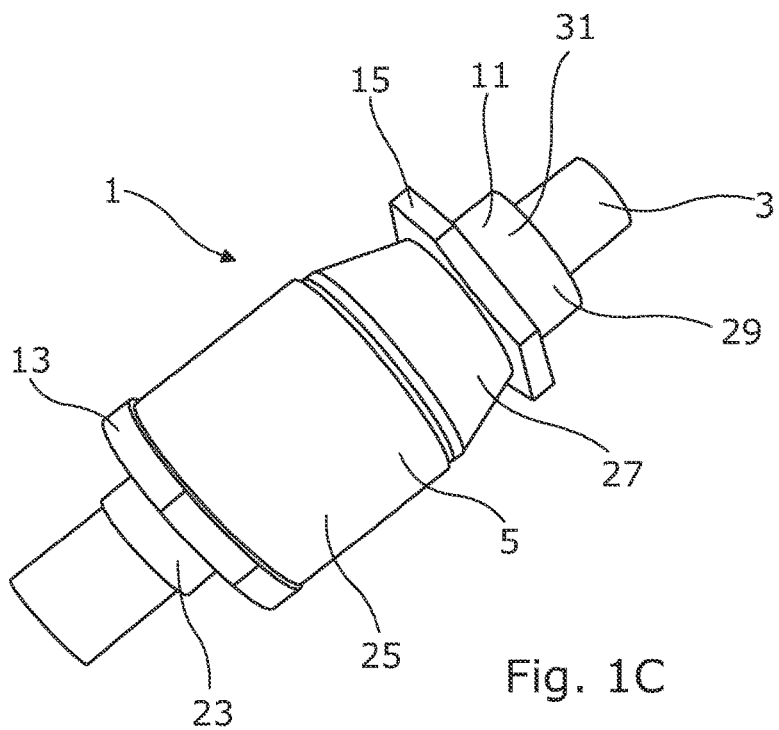
FIG. 1C is a perspective view of the cable gland of FIG. 1A, assembled with a cable.
Figure 1B:
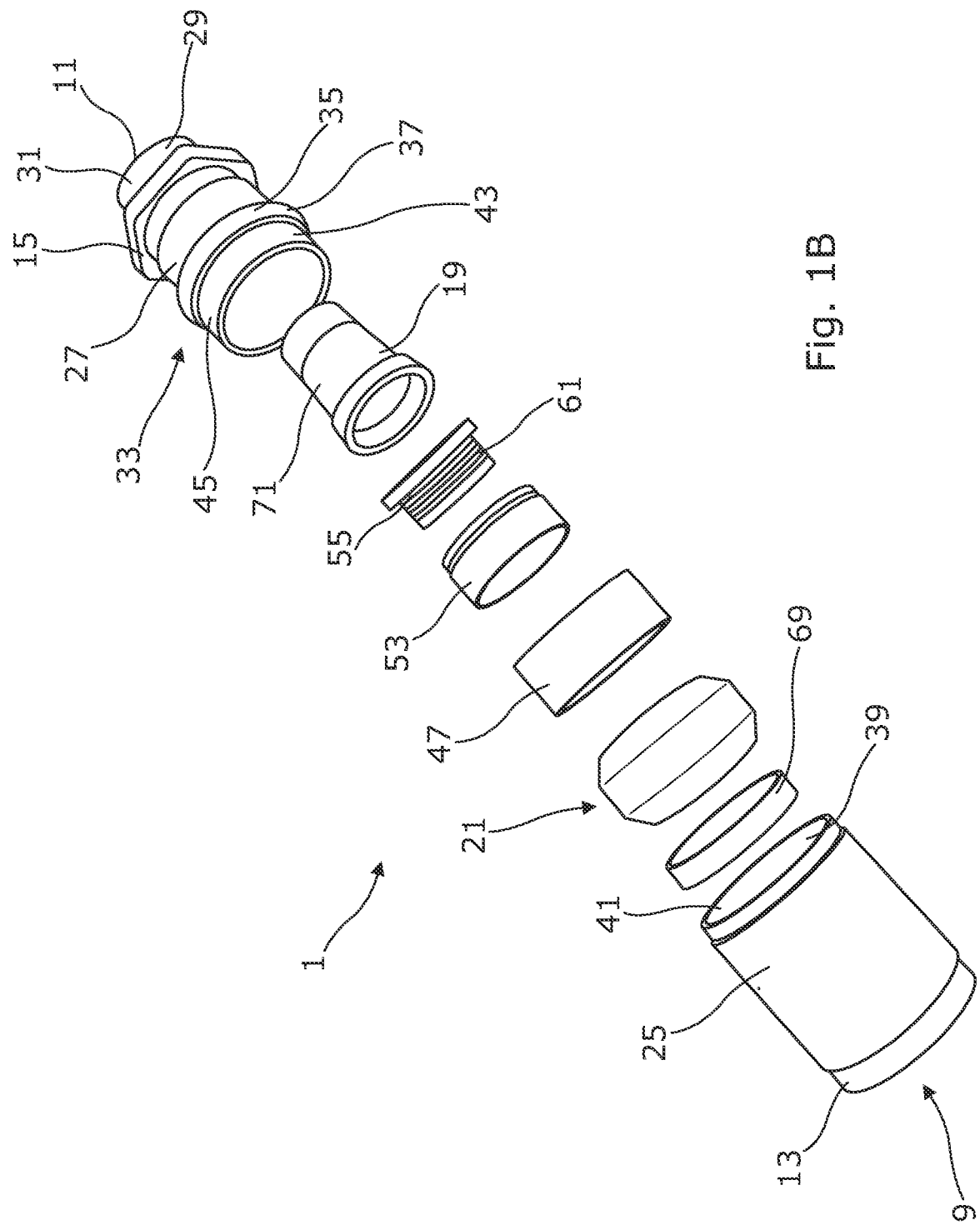
FIG. 1B is a perspective exploded view of the cable gland of FIG. 1A.

FIGS. 1A to 1C illustrate an example of a cable gland 1 according to an embodiment of the invention. FIG. 1A illustrates the cable gland 1 in assembled form, without a cable, in sectional side view, and FIG. 1B illustrates the cable gland 1 in exploded view. FIG. 1C illustrates the cable gland 1, in assembled form, with a cable 3 passing through it. The cable 3 typically includes a number of conducting cores 110 (shown in FIG. 4), each having its own insulating jacket (not shown). The cores are surrounded by an inner sheath (not shown). This, in turn, is surrounded by an insulating outer sheath (not shown). An earthing shield, such a braid or armour, is provided between the inner and outer sheath.

The cable gland 1 includes a body 5 formed by an annular wall 7. The wall 7 defines a passage 9 extending through the body 5 in an axial direction A. The passage 9 extends from a first end 11 of the body 5 to a second end 13. Adjacent the first end 11, an external flange 15 is formed on the body for mounting the cable gland 1 to a wall, bulkhead or housing (not shown) through which the cable 3 is passing. In use, the first end 11 of the cable gland 1 is provided through an opening in the bulkhead, and the second end 13 is in an external environment.

Within the passage 9, near the first end 11, a sleeve-like sealing member 17 is formed in a compound pot 19. Also within the passage 9 is a clamp 21 for gripping on to the external insulation cover of the cable 3. The clamp 21 is provided between the compound pot 19, and the second end 13. At the second end 13, an ingress prevention seal 23 is provided over the opening of the passage 9. Further explosion protection seals (not shown) may also be received in the passage 9, and an external rubber seal is provided on the outside of the body 5. The compound pot 19, clamp 21 and ingress prevention seal 23 will be discussed in further detail below.

The body 5 is formed of a first part 25 and a second part 27. Each of the parts 25, 27 forms an axial portion of the body 5, such that each of the parts 25, 27 extends around the circumference of the passage 9, and along a portion of the length.

The first body part 25, also referred to as the entry, incorporates the first end 11 and the external flange 15, and receives the compound pot 19. Between the first end 11 and the external flange 15, the first body part 25 includes a cylindrical portion 29. This may include a screw thread or the like 31 for receiving a nut to secure the gland to the bulkhead through which the cable passes.

Figure 2:
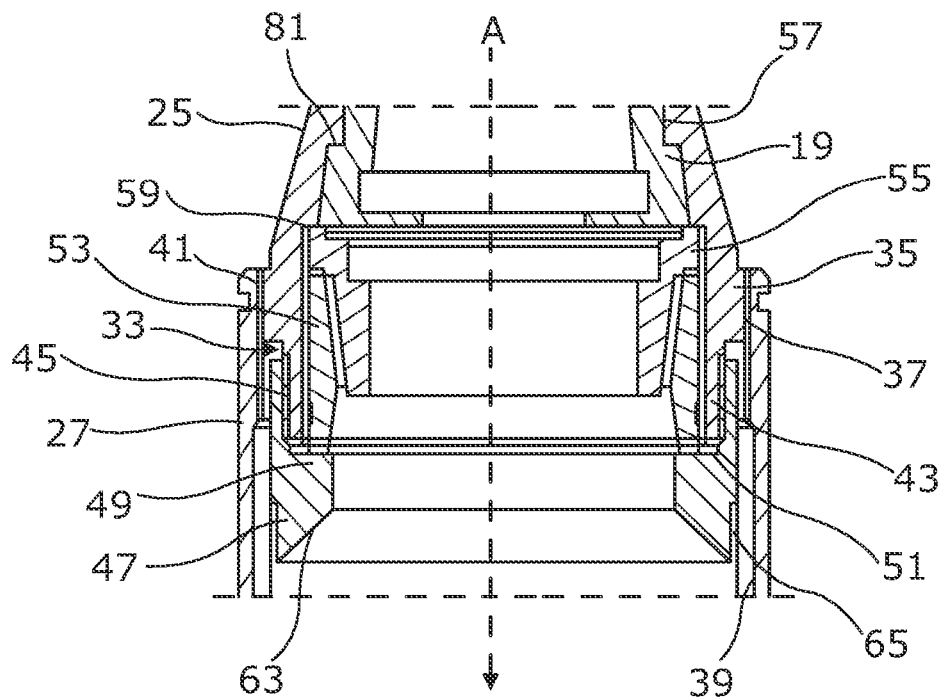
FIG. 2 shows the region of the cable gland of FIG. 1A where the first and second body portions join, in sectional view.

The first body part 25 tapers outward, away from the first end 11, after the flange 15. A further cylindrical section 33 is provided opposite the first end 11 of the body 5. In the assembled gland 1, the further cylindrical section 33 is received within the second body part 27. FIG. 2 illustrates the region where the first body part 25 extends into the second 27.

A first region 35 of the further cylindrical section 33, adjacent the taper, includes a first screw thread 37. The width of the first region 35 is such that the first screw thread 37 engages with a corresponding screw thread 41 on the inner surface 39 of the second portion 27, to join the body parts 25, 27 together. Tightening the screw thread applies compression between the first end 11 and the second end 13.

A second region 43 of the further cylindrical section 33, at the end of the first body part 25 opposite the first end 11, is of narrower diameter than the first region 35. The second region 43 includes an external screw thread 45 to secure a spigot retaining nut 47 to the end of the first body part 25. The spigot retaining nut 47 extends axially, to continue the second region 43 of the further cylindrical section 33.

On a first axial face 49 of the spigot retaining nut 47, at which the spigot retaining nut 47 joins the first body portion 25, a radially extending ledge 51 is formed, extending into the passage 9. The ledge 51 forms a seat for an armour clamp 53 arranged to grip the earth shielding of the cable, and electrically couple the earth shielding to the body 5 of the gland 1.

A spigot (or annular retaining member) 55 is located between a ledge 57 formed in the inner surface 59 of the first body part 25, and the end of the armour clamp 53. The spigot 55 includes grooves 61 formed on the tapered surface extending inside the armour clamp 53, and an annular rim 63 which engages the ledge 57 in the first body part 25, and extends radially inward to form a seat for the compound pot 19. The spigot 55 is retained in place by the ledge 57 on one face, and the armour clamp 53 and retaining nut 47 on the other face.

The second axial face 65 of the spigot retaining nut 47 forms a seat for the clamp 21, as will be discussed in more detail below. The cable 3 is passed through the spigot retaining nut 47, armour clamp 53 and spigot 55. The earthing shield (not shown) is gripped by the armour clamp, in co-operation with the grooves 61 on the surface of the spigot 55.

The second body part 27 forms a back nut of the cable gland 1. The clamp 21 is received within the part of the passage 9 formed by the back nut 27. The second body part 27 includes an annular ledge 67 extending across the second end 13. An annular ring 69 is provided within the passage 9, resting on the ledge 67, and provides a second seat for the clamp 21, such that the clamp 21 is received between the ring 69 and the spigot retaining nut 47.

Figure 3A:
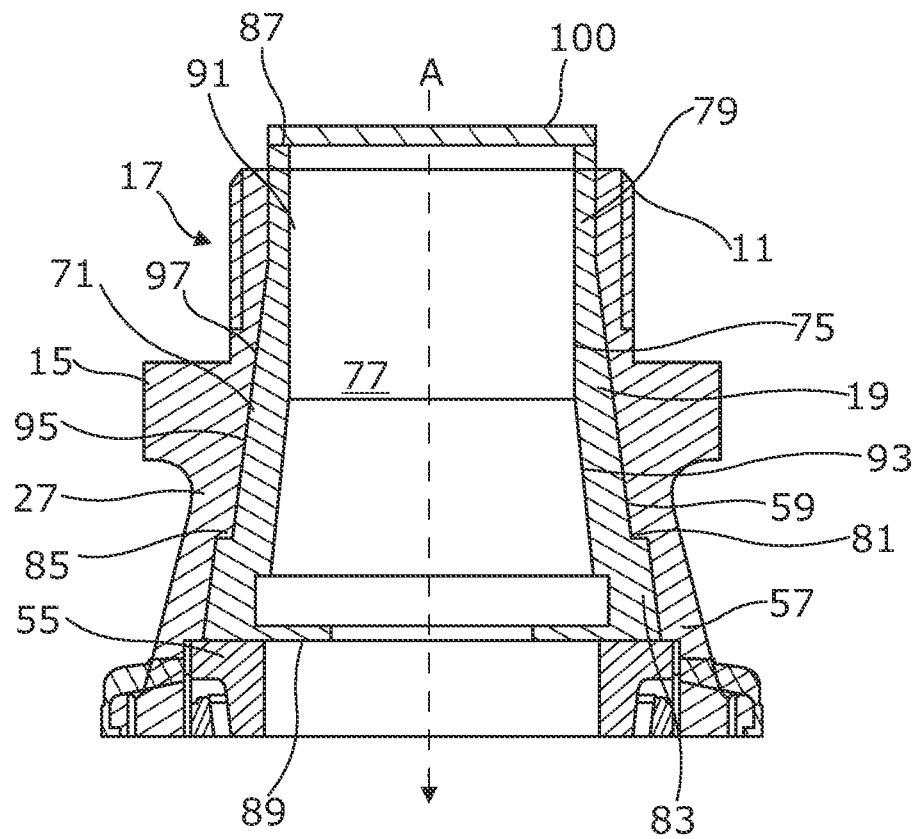
FIG. 3A shows the region of the compound pot of the cable gland of FIG. 1A, in sectional view.
Figure 3B:
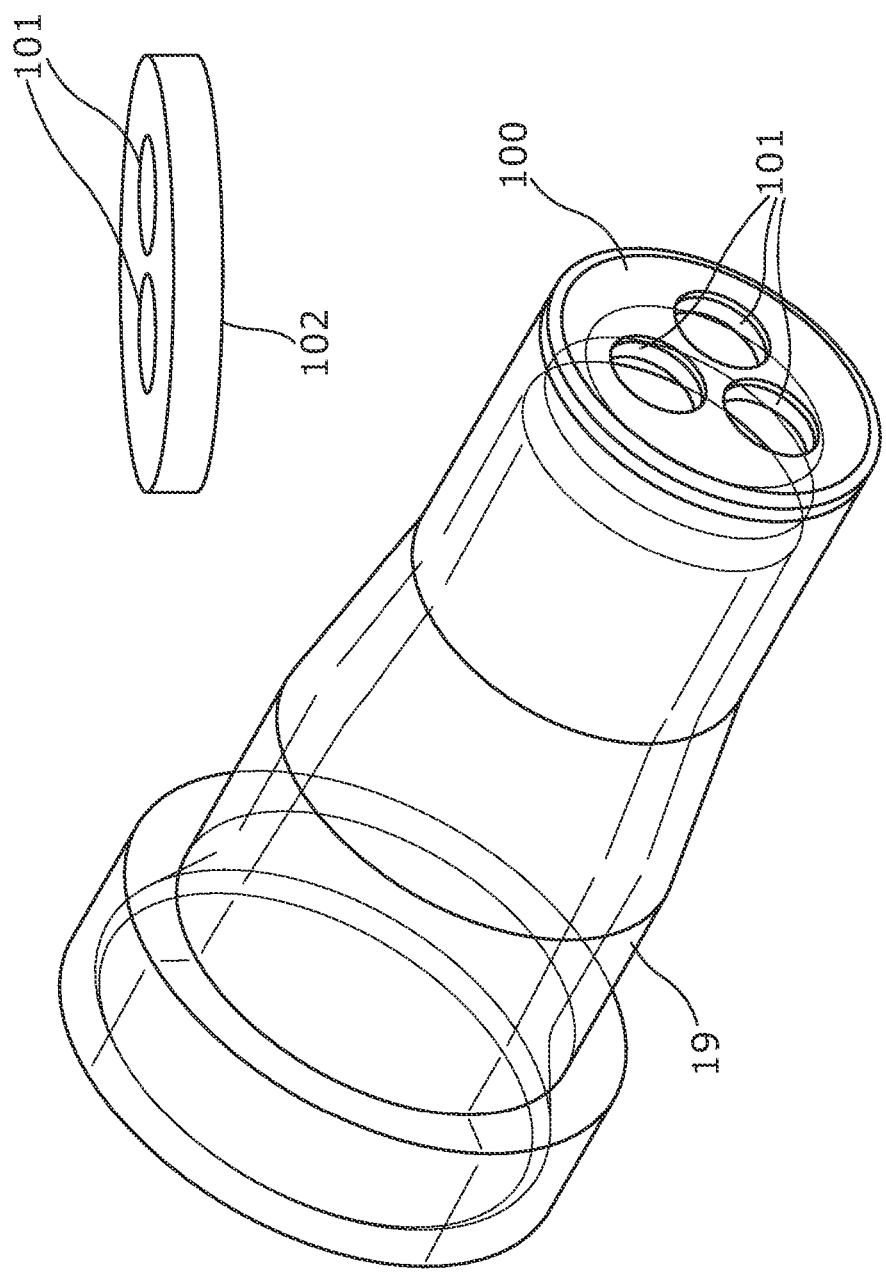
FIG. 3B shows a perspective view of the compound pot of the cable gland of FIG. 1A.

FIG. 3A illustrates the region of the compound pot 19, in more detail, with FIG. 3B showing the compound pot 19 by itself.

The compound pot 19 is formed of a transparent polymer cylindrical wall 79, extending from a first end 87 to a second end 89. The first end 87 of the wall 79 is received at the first end of the gland 11, and the second end 89 of the wall is within the passage 9.

The wall 79 has an outer surface 71, that engages with an inner surface 59 of the first body portion 25, and an inner surface 75 that forms a through passage 77, through which the cable 3 extends, in the assembled gland 1.

The outer surface 71 includes a ledge 81 formed in a rim 83 at the second end 89, which engages with a step 85 formed in the inner surface 75 of the first body member 25, to retain against the pot 19 being pulled out in a direction towards the first end 11.

A spacing is formed between the ledge 81 and the step 85, along the axial direction A, and, optionally also in a radial direction. The outer surface 71 is tapered inwards from the rim 83 to the first end 87, to form a tapered region 95. The inner surface 75 of the first body portion 25 includes a matching tapered portion 97.

The inner surface 75 of the cylindrical wall 79 includes a cylindrical portion 91 adjacent the first end 87, with a tapered portion 93 tapering inwards form the second end 89 to the cylindrical portion 91.

The compound pot also has an end wall 100, which caps the first end 87 of the wall 79. The end wall seals the first end apart from orifices 101 for the cores 110. The end wall 100 is removable and clips onto the wall 79, to allow for a plurality of different end walls (e.g. alternative end wall 102 which has only two orifices 101, rather than the three orifices 101 of the end wall 100) to be placed onto the wall 79. Thus, this allows an installer to create an appropriate compound pot 19 dependent on the number and/or size of the cores 110.

In an alternative embodiment, the end wall can be formed from a settable material, which is pressed and/or moulded around each core 110.

In use, the pot 19 is provided in the first body part 25, and the cable is passed through component parts of the gland 1, without screwing the body portions 25, 27 together. The first part can be removed or slid out of the way for the time being.

Figure 4:
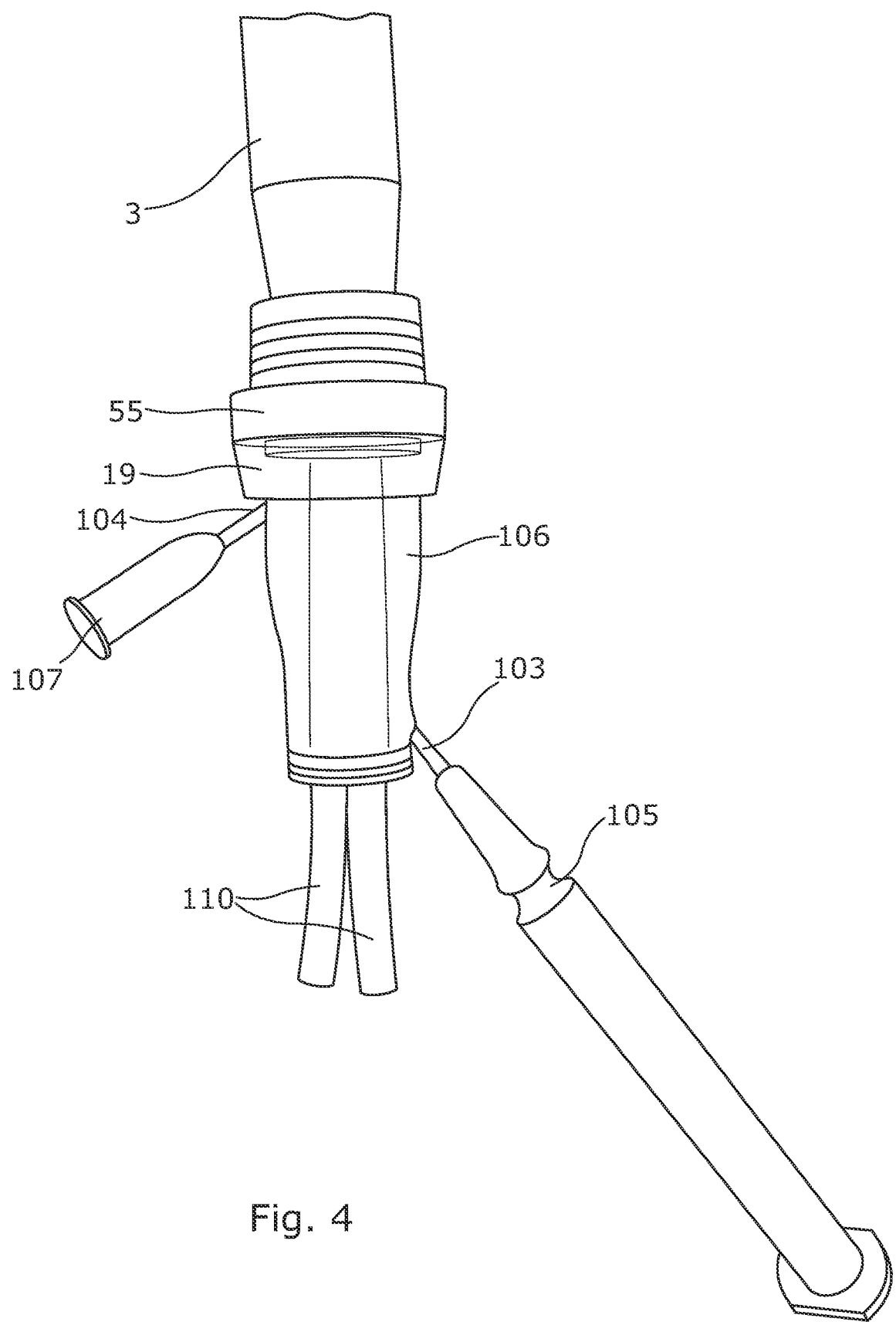
FIG. 4 shows a perspective view of the compound pot of the cable gland of FIG. 1A, being filled.

A settable sealing material (not shown) is injected into the pot 19 as shown in FIG. 4 and allowed to set to form a plug. This is done using two hollow needles, each of which are used to puncture the wall 79 to as to access the void 106 within the compound put. First needle 103 is connected to a syringe 105 full of the settable sealing material. Pumping the syringe 105 causes the settable sealing material to flow through the first needle 103 into the void 106 (and around the cores) formed within the pot 19. The second needle 104 allows air that was otherwise in the void 106 to escape through exhaust port 107. Thus, the sealable setting material can flow around the cores to fill the void and seal against spigot 55.

As such, unlike the compound pot described in our earlier PCT patent application PCT/GB2019/051382, the filling can occur with the compound pot in any orientation; the end wall 100 will prevent the settable sealing material from leaking out. The transparent material of the compound pot allows visual inspection to ensure that the sealable setting material fills the void 106, leaving no voids remaining, so the pot is properly filled and the plug is properly formed around the cable 5. The pot 19 is then slid back into the first body part 25.

When the first and second body part 25, 27 are screwed together, the pot 19 and plug are compressed. Even under compression, at the ledge 81 in the compound pot 19 is spaced from the step 85 in the inner surface 75 of the first body member 25, to ensure that the tapered regions 95, 97 engage, rather than the ledge 81 and step 85. Therefore, a seal is formed between the pot 19, and the inner surface 59 of the first body member 25, along the length of the tapered region 95, 97.

The invention has application including but not limited to Gland assemblies for armoured electric cable or fibre optic cable or pipes or conduits;
Gland assemblies for non-armoured electric cable or fibre optic cable or pipes or conduits;
Barrier gland assemblies for electric cable or fibre optic cable or pipes or conduits; and
Non-barrier gland assemblies for electric or fibre optic cable or pipes or conduits.

While the invention has been described with reference to exemplary embodiments, it will be understood that we do not intend the invention to be limited thereto and that various modifications and changes may be made without departing from the principles and concepts of the invention.

Other modifications and changes that can be made without departing from the principles and concepts described herein will be apparent to those skilled in the art and are covered herein.

It will also be understood that the invention extends to and includes any novel feature or combination of novel features described herein.

The invention claimed is:

1. A sealing apparatus for a cable gland, comprising:
a sleeve arranged to be slidably received within a passage defined in a body of a cable gland, the sleeve arranged to receive a settable sealing material for forming a seal to a cable passing through the sleeve,
wherein the sleeve comprises:
an annular side wall extending along an axial length and having a first end and a second end; and
an end wall capping the first end of the annular side wall,
in which the annular side wall and the end wall define a void within them into which settable sealing material can be received;
a hollow member for delivering settable material into the void; and
a further hollow member for exhausting air from the void.

2. The sealing apparatus of claim 1, in which the end wall has at least one orifice through which a core of the cable can pass.

3. The sealing apparatus of claim 1, in which the end wall is non-unitary with the annular side wall.

4. The sealing apparatus of claim 3, in which the end wall can be removed or replaced on the side wall without breaking any material from which the annular side wall or end wall is formed.

5. The seal apparatus of claim 1, in which each orifice may be provided as a press-out portion of the end wall, whereby a circumference of each orifice is formed in the end wall such that a portion of the end wall within each circumference can be pushed out by a user to form the orifice.

6. The sealing apparatus of claim 1, in which the end wall is formed from a settable material.

7. The sealing apparatus of claim 1, being transparent.

8. A cable gland comprising: a body having a wall defining a passage extending in an axial direction from a first end to a second end, the passage of the cable gland arranged to receive a cable; adjacent the first end of the cable gland body, the cable sleeve of the sealing apparatus in accordance with claim 1, received within the passage of the cable gland.

9. The sealing apparatus of claim 1, in which the hollow member is arranged to puncture the material of the sleeve in order to pass through the sleeve to deliver the settable sealing material into the void, for example by having a sharpened tip.

10. The sealing apparatus of claim 1, in which the further hollow member is also be arranged to puncture the material of the sleeve in order to pass through the sleeve to allow air within the void to be exhausted, for example by having a sharpened tip.

11. The sealing apparatus of claim 1, comprising a plurality of end walls for the sleeve, each differing the number or size of orifices defined therein.

12. A method of installing a cable having at least one core in a cable gland comprising: a body having a wall defining a passage extending in an axial direction from a first end to a second end, the passage of the cable gland arranged to receive a cable; adjacent the first end of the cable gland body, a cable sleeve arranged to be slidably received within the passage, the sleeve arranged to receive a settable sealing material for forming a seal to the cable, wherein the sleeve comprises; an annular side wall extending along an axial length and having a first end and a second end; and an end wall capping the first end of the annular side wall, in which the annular side wall and the end wall define a void within them into which settable sealing material can be received, claim the method comprising:
- passing the cable at least partially through the cable gland;
- exposing at least one core of the cable at an end of the cable;
- placing the sleeve over each core at the end of the cable;
- puncturing the sleeve with a first hollow member and a second hollow member;
- filling the sleeve with sealable setting material by introducing the sealable setting material with the hollow member and using the first hollow member for delivering the sealable setting material into the void;
- exhausting air from the void through the second hollow member as the sealable setting material is introduced; and
- assembling the cable gland over the sleeve so as to seal the cable gland over the cable.

13. The method of claim 12, wherein the step of placing the sleeve over each core comprises selecting an end wall from a plurality of end walls having a number of orifices, each orifice having a size, each end wall of the plurality of end walls differing in the number or size of orifices defined therein, and placing the end wall on an annular side wall to form the sleeve.

14. The method of claim 12, comprising forming the end wall from a settable material, which is pressed and/or moulded around each core.

15. The method of claim 12, further comprising connecting a syringe to the first hollow member and pumping the syringe to deliver the sealable setting material into the void.

16. A sealing apparatus for a cable gland, comprising:
- a sleeve arranged to be received within a passage defined in a body of the cable gland, the sleeve arranged to receive a settable sealing material for forming a seal to a cable passing through the sleeve, wherein the sleeve comprises:
  - a side wall extending along an axial length and having a first end and a second end; and
  - a first end wall sealed against the first end of the side wall,
  - a second end wall sealed against the second end of the side wall
  - wherein the side wall, the first end wall, and the second end wall define a void within them into which settable sealing material can be received;
- a hollow member configured to deliver settable sealing material into the void; and
- a further hollow member configured to exhaust air from the void.

17. The sealing apparatus of claim 16, wherein the second end wall is a spigot that is connected to the side wall by a retaining nut.

18. The sealing apparatus of claim 16, further comprising an exhaust port connected to the further hollow member, wherein the exhaust port is configured to exhaust air from the void as the hollow member delivers settable sealing material.

19. The sealing apparatus of claim 16, further comprising a syringe connected to the hollow member and configured to pump settable sealing material into the void, and wherein the further hollow member is configured to exhaust air from the void as the syringe is pumping settable sealing material.

20. The sealing apparatus sleeve of claim 16, wherein the side wall is transparent and configured to permit observation of the void while the settable sealing material is delivered.

* * * * *